Oct. 25, 1938.   H. J. BABCOCK   2,134,098
STERILIZING APPARATUS AND METHOD
Filed July 31, 1933   2 Sheets-Sheet 1
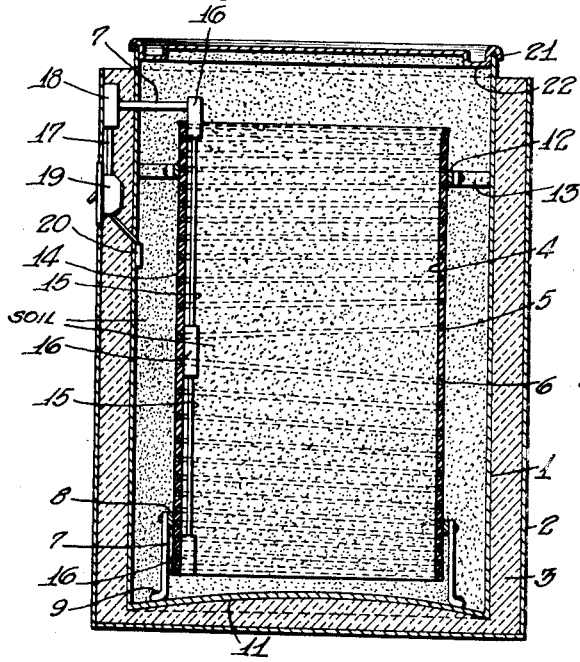
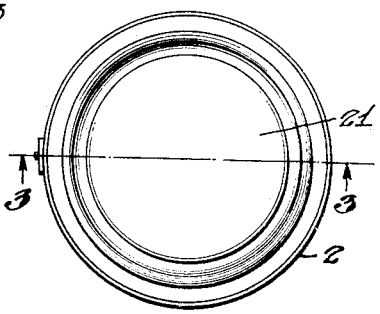
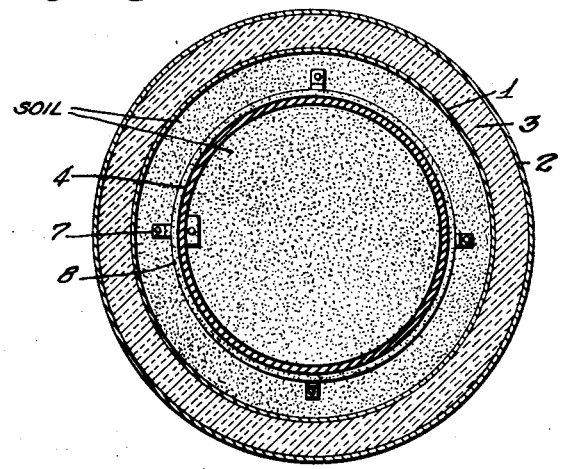
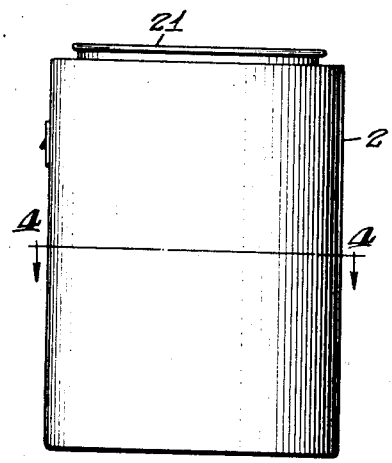
Inventor:
HAROLD J. BABCOCK,
By Saywell & Weisseler,
Attorneys.

Oct. 25, 1938.  H. J. BABCOCK  2,134,098
STERILIZING APPARATUS AND METHOD
Filed July 31, 1933  2 Sheets-Sheet 2
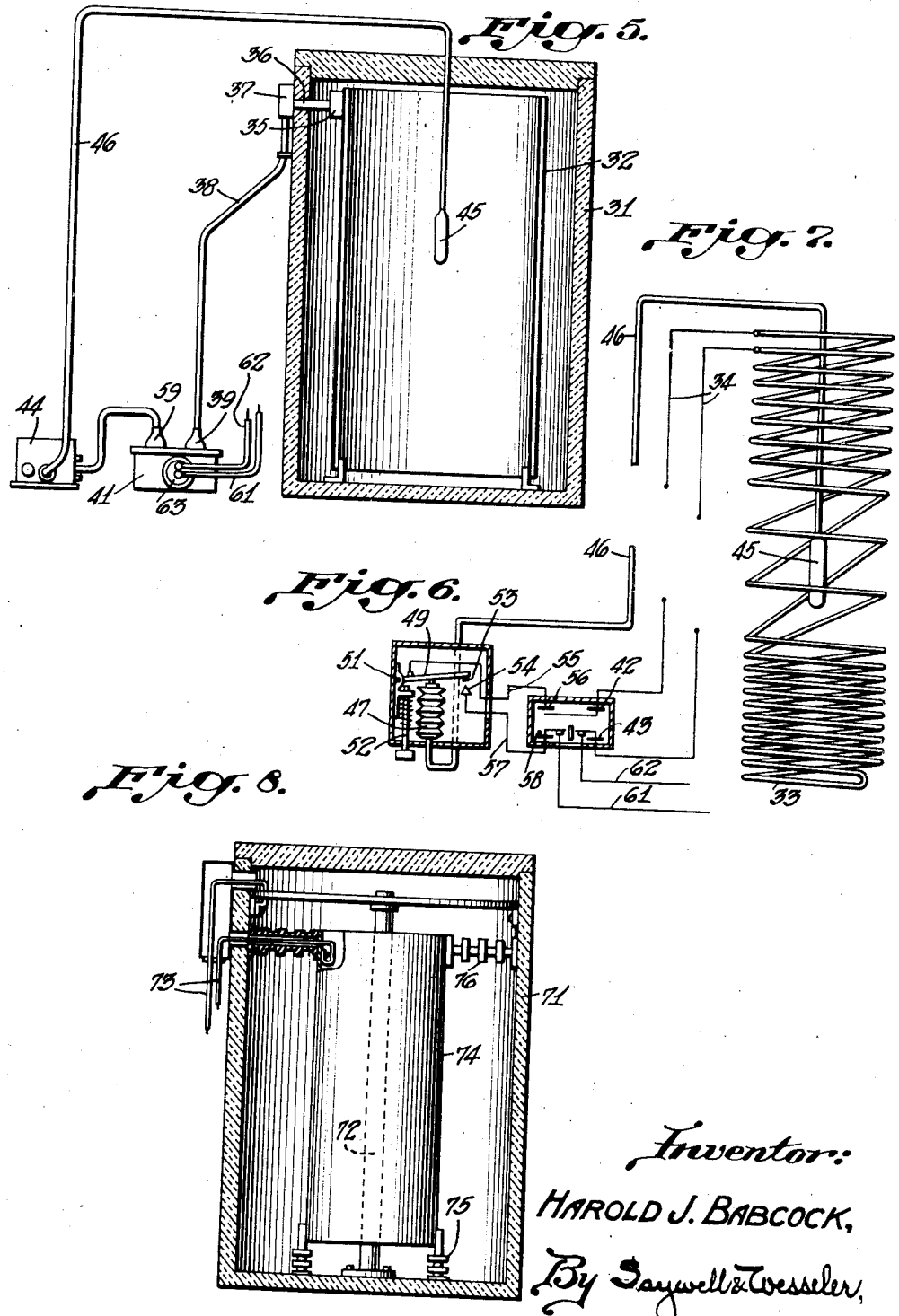
Inventor:
HAROLD J. BABCOCK,
By Saywell & Woessler,
Attorneys.

Patented Oct. 25, 1938

2,134,098

UNITED STATES PATENT OFFICE 2,134,098

STERILIZING APPARATUS AND METHOD

Harold J. Babcock, Cleveland Heights, Ohio

Application July 31, 1933, Serial No. 682,955

5 Claims. (Cl. 219—35)

This invention relates to a sterilizing apparatus and method. More particularly, it has in view the provision of a simple and economical apparatus which is adapted for the treatment of soil to free the same from harmful elements such as seed and plant destroying fungi, bacteria, and insect life, and also to destroy weeds and their seeds, preliminary to the use of such soil in germinating seeds, propagating cuttings, and growing plants and other vegetables.

Through such treatment it is important to secure uniform heat distribution over not too great distances and to maintain the temperature range between points sufficient to destroy harmful organic life, while affecting very slightly or to no degree the beneficial elements of organic life in the soil, among them the nitrogen and ammonia producing organisms.

Heretofore it has been proposed to heat soil in situ with the view to destroying objectionable organic matter within the soil, particularly through steaming operations, but such operations are difficult to satisfactorily control and involve considerable wastage of the heating medium as well as lack of uniformity in results produced.

The present invention has for its principal object the provision of an apparatus and method for sterilizing soil so that dependable results may be obtained, and propagation of plant life carried on with the assurance that no harmful organic matter is present in the soil preliminary to its being used for the special work in hand.

Another object of the invention is to provide a very large extent of heat radiating surface through the use of a very long continuous electrical resistance element, thus providing a relatively low temperature differential between such heating element and the actual temperature attained in the soil, and avoiding high temperatures harmful to beneficent organisms.

A further object of the invention is to provide an inexpensive readily portable apparatus which will distribute the heat throughout the soil undergoing treatment in a substantially uniform amount throughout the full extent of the apparatus.

Another object of the invention is to provide a method of sub-dividing the soil undergoing treatment in such manner that portions of the soil will act as a heat retaining element with reference to the remaining portion of the soil, and that all portions of the soil undergoing treatment will receive approximately uniform quantities of heat, and with the heat traveling from a source positioned at an intermediate point in two directions inwardly and outwardly rather than inwardly only from heating means disposed about the circumference of the container.

Another object of the invention is to provide a method and apparatus for applying both heat for the purpose of destroying harmful organic life within the soil undergoing treatment as well as steam to suitably condition such soil for certain uses.

Another object of the invention is to provide for an electrolytic type of apparatus for direct heating of the soil, as well as heating through resistance elements in the manner set forth in the preferred form of the invention.

Other and further objects of the invention will appear in the course of the following description.

To the accomplishment of the foregoing and related ends, said invention, then, consists of the means and method hereinafter fully described and particularly pointed out in the claims, the annexed drawings and the following description setting forth in detail certain means and methods embodying the invention, such disclosed means and methods constituting, however, but several of various forms in which the principle of the invention may be used.

In said annexed drawings:

Figure 1 is a top plan view of an apparatus embodying the principles of the invention;

Figure 2 is a side elevation of the apparatus shown in Figure 1;

Figure 3 is a central vertical sectional view, taken along the line 3—3, shown in Figure 1, looking in the direction of the arrows;

Figure 4 is a central transverse sectional view, taken along the line 4—4, shown in Figure 2, looking in the direction of the arrows;

Figure 5 is a diagrammatic view, partly in section, showing an apparatus provided with an independent thermostatic control;

Figure 6 is a diagrammatic view of the thermostatic control and series plug shown in Figure 5;

Figure 7 is a diagrammatic view of the heating element and thermostat embodied in the structure shown in Figure 5; and Figure 8 is a central vertical sectional view of an electrolytic type of apparatus.

As is clearly shown in the drawings, the preferred form of apparatus comprises a container 1 preferably of cylindrical form, and in the specimen illustrated comprising a sixty-five gallon drum adapted to hold approximately nine cubic feet of soil and being approximately two feet in diameter and three feet high, although the dimensions set forth are purely illustrative and by no means essential to the successful operation of the invention.

The container just described is formed as a double walled receptacle, there being provided an outer shell 2 also preferably formed of sheet metal and of sufficiently larger diameter than the container 1 to permit the interposition between the same of a heat insulating filling 3, preferably of rock wool or some equivalent heat insulating material.

Within the receptacle so formed, a heating element 4, preferably in the form of a hollow cylindrical structure open at each end, is provided, such element carrying suitably insulated electrical resistance elements 5, 6, adapted to provide the desired quantity of heat, as will be hereinafter explained. The hollow cylindrical structure is preferably supported at its lower end by means of a plurality of standards 7, secured to a supporting circumferential band 8 secured about the lower portion of the element, and such standards having outwardly turned lower ends 9 fastened to the base 11 of the container. The upper portion of the hollow cylindrical element is likewise provided with a supporting band 12, to which at intervals a bracket arm 13 is secured to maintain the same in spaced relation to the adjacent inner wall surface of the receptacle.

The hollow cylindrical element 4 is preferably formed of a pair of sheet metal plates, one of slightly smaller diameter than the other, telescoped within each other so as to provide an intermediate space 14 between the walls to accommodate the resistance elements 5, 6, which are preferably non-inductively wound in paired circumferential windings about the inner shell and fitted closely within the outer shell. The ends of the sheet metal shells forming the hollow cylindrical element may be crimped upon each other or secured or locked to each other in any suitable manner, and bands with suitable tensioning elements may be used to bring the outer shell into close relation to the inner shell and its superimposed coils of wire.

The electrical resistance elements 5 and 6 preferably are formed of a nichrome or like resistance element suitably encased and insulated in lead or steel sheathed cable or the like. Such insulation may be formed of several layers of impregnated fabric having Glyptol or some insulating lacquer thereover and having an outer sheath or cover preferably of lead or lead alloy. The wire, as is clearly shown in Figure 3 is wound about the inner shell of the hollow cylindrical element from a point approximately centrally of said element in helical form toward the top of said element, the turns of wire being more closely spaced adjacent the top so as to provide increased heating effect at such point. Likewise the wire is wound in a helical coil toward the lower end of the hollow cylindrical element, the wires likewise being more closely spaced adjacent the lower portion, and preferably in a greater degree of closeness than adjacent the top in view of the fact that the lower portion of the container would normally receive less heat than the upper portion and therefore would require a greater proportion of heat transferring means at such point.

The terminals of the two sections of electrical resistance elements 5 and 6 are carried through conduit sections 15 and connecting boxes 16 positioned at one side of the inner wall of the hollow cylindrical element and such conduit is carried by means of cross conduits 17 and connecting box 18 to a terminal plug 19 providing a suitable connection with the power line. The power may be carried through a flexible cable (not shown) and a thermostatic element 20 may be associated with the terminal 19 or placed elsewhere in the apparatus.

The receptacle may be provided with a cover 21 having a circumferential depression 22 so as to provide a snug fit for the apparatus and to permit the natural moisture of the soil to form a certain degree of steam pressure within the container. If desired, suitable apertures with or without valves may be provided in the cover to limit the steam pressure to any amount required for the particular conditioning of the soil.

The procedure with an apparatus of the character described comprises the filling of the receptacle with the soil which it is desired to sterilize, such soil being placed about the periphery of the hollow cylindrical element as well as within the same and the container completely filled to its upper portion. The current is then turned on and the contents of the container provided with heat of something above 140° Fahrenheit, and ranging preferably from 140° to 220° Fahrenheit, under which conditions the apparatus described is adapted to thoroughly sterilize the soil placed within the same. The period of sterilization may vary with the moisture content and other characteristics of the soil, but if soil of average condition is treated, a continuous heating of the same for a period of approximately eight hours is adequate to completely destroy all objectionable organic matter within the same.

Where vapor treatment of the soil is desired, a gas-tight cover is required and with soil having a moisture content of approximately seventeen per cent, a satisfactory quantity of steam will be generated to thoroughly condition the soil as to friability as well as to a proper degree of sterilization.

In place of winding the heating elements about the hollow cylindrical member in the form of a helix or a pair of helices, the same may be secured to one of the walls of a shell forming the hollow cylindrical element, by winding the same in sinusoidal loops about the projections extending inwardly from such container walls. In such event, it is preferable to provide somewhat longer widely spaced loops adjacent the upper portion of the hollow cylindrical element and shorter more closely spaced loops adjacent the lower portion thereof so as to provide more heating surface adjacent the lower portion of the container than adjacent its upper portion.

Through the apparatus above described, soil for use in growing plants in pots, flats, greenhouse benches, or garden plots, may be provided in the quantities required by successively treating portions thereof as above outlined.

In the structure shown in Figures 1 to 4 inclusive, a thermostatic element is shown as disposed within the container adjacent one side thereof, such thermostat being a permanent part of the apparatus. In view of the fact that it may be found desirable to supply containers without thermostatic control, and to provide independent thermostatic elements to be used whenever more refined control of the apparatus is required for certain special soil treatment operations, the apparatus shown in Figures 5, 6 and 7 is provided. The container 31 is substantially similar to that heretofore described, having a cylindrical element 32 within the same carrying the resistance element 33, which as shown in Figure 7, may be non-inductively wound. The conducting elements 34 forming part of the electric circuit connecting with the heating elements are carried through a connecting box 35 and a cross conduit 36 to a box 37 having a flexible cable 38 extending therefrom and carrying a terminal plug 39.

When the device is used without a thermostatic element, the plug 39 is adapted to be fitted into any suitable outlet box connected with a source of power. When it is desired to use a thermostatic element in connection with the apparatus, the plug 39 is fitted into a series junction box 41 connecting with the contacts 42, 43. The thermostatic control element is housed in a casing 44. The bulb 45 of the thermostat is connected by a conventional tube 46 with a closed metal bellows 47 at one end, the other end of the bellows having a bar 48 adapted to bear against a movable switch member 49, pivotally supported at one side of the casing upon a pivot pin 51, and having an adjusting bar 52 to shift the same upon the casing wall to secure any desired degree of temperature control. The free end of the switch member carries the contact 53 cooperating with a fixed contact 54. The conducting member 55 from the movable switch member is connected with a contact 56 within the junction box 41, and the conductor 57 from the fixed terminal is connected with a contact 58 within the junction box through a plug 59 carrying said conductors. The current is supplied to the junction box through the conductors 61, 62, which are provided with a terminal plug 63 adapted to be engaged in the side of the junction box. Thus the junction box serves to connect the thermostatic circuit with the heating unit circuit in series, and it is unnecessary to change the wiring of the apparatus which is ordinarily equipped with a single terminal for plugging into an outlet box of a source of current supply with a permanent attachment for a thermostatic control element. It is obvious that the thermostatic element may be removed and a suitable conducting plug inserted in place of the plug 59 of the thermostatic control to complete the circuit for the apparatus independently of the thermostat, should the convenience of operation make such arrangement desirable.

The method embodied in the invention comprises the steps of providing electrical heating means in the form of a hollow cylindrical element, and spacing soil to be treated about the circumference thereof as well as within the interior thereof and beyond each of the ends thereof, to such extent that the degree of heat imparted to the adjacent soil by such heating element will be substantially uniform throughout the extent of such interposed and surrounding soil.

The method also includes the proportioning of the extent of heating element within a container, particularly a container open at one end, in such manner that the amount of heat transmitted through the confined lower portion thereof is transmitted by a greater extent of heat transferring elements, and adjacent the upper portion by a lesser extent of heat transferring elements, so that substantially uniform heat conditions will prevail throughout the soil area referred to. Thus, the masses of soil are proportioned and distributed throughout the apparatus, as well as intermediate the heating elements, so that maximum efficiency of the apparatus is secured and substantially uniform temperatures are maintained.

Where a valve is utilized in the cover to combine steam treatment with the heat treatment, it is preferable to use a valve permitting a pressure range of from one to five pounds.

In place of utilizing electrical resistance elements to transfer heat to the soil, the current conducting container 71, as shown in Figure 8, may be formed with a central electrode 72 integral with the bottom and side walls and serving with them as the negative terminal of an electrical circuit 73. Insulated from the terminal elements just described, a positive electrode is provided, preferably in the form of a hollow cylindrical current conducting shell 74 surrounding the central electrode and supported upon insulating standards 75 in spaced relation to the bottom, and insulating spacing members 76 at the sides. The other end of the circuit is connected with the shell 74 preferably through an aperture in one of the insulating supports 76. When the circuit is closed, the currents of electricity will flow from positive electrode 72 in each direction toward the outer walls of the container and toward the central negative electrode just described. In this manner with the proper moisture content of the soil, a suitable degree of heating action may be applied to the intermediate soil as well as the electrolytic effects due to current conduction through the moist soil, and soil conditioning can be brought about in such manner. The quantity of current required and the rate of sterilization brought about will conform to the particular requirements of the work in hand including the character of the soil treated and the time permitted for the various operations.

Other modes of applying the principle of my invention may be employed instead of the one explained, change being made as regards the structure herein disclosed, provided the means and steps stated by any of the following claims, or the equivalent of such stated means and steps, be employed.

I therefore particularly point out and distinctly claim as my invention:

1. A method of sterilizing soil which comprises the steps of providing a hollow cylindrical non-inductive electrical heating element having higher effectiveness for heating adjacent its lower portion than its upper portion, surrounding the same with a hollow cylindrical layer of soil of predetermined thickness adapted to serve as an insulating heat confining element as well as material for heat treatment, placing, within the center of such element and its protective layer, a core of additional soil of slightly less total mass than the hollow layer of soil, and thereafter applying heat through such cylindrical hollow heating element to effect uniform distribution of heat throughout the mass of soil referred to.

2. An apparatus of the character described, having in combination a closed heat insulated container of substantially cylindrical form having side and bottom walls, a hollow cylindrical electrical heating element engaged within said container in spaced relation to the side and bottom walls thereof, and providing two substantially concentrically arranged areas, centrally of said container, to receive substantially separate outer and inner masses of the material to be treated, said outer area being of somewhat greater capacity than said inner area, and the mass of material in said outer area serving to heat insulate the mass of material in said inner area and means for conducting current to said hollow cylindrical element.

3. An apparatus of the character described, having in combination a closed heat insulated container of substantially cylindrical form having side and bottom walls, a hollow cylindrical electrical heating element engaged within said container in spaced relation to the side and bottom walls thereof, and providing two substantially concentrically arranged areas, centrally of said container, to receive substantially separate outer and inner masses of the material to be treated, said outer area being of somewhat greater capacity than said inner area, and the mass of material in said outer area serving to heat insulate the mass of material in said inner area and means for conducting current to said hollow cylindrical element and controlling the rate of current supply in proportion to the heat required.

4. An apparatus of the character described, having in combination a closed heat insulated container of substantially cylindrical form having side and bottom walls, a hollow cylindrical electrical heating element engaged within said container in spaced relation to the side and bottom walls thereof, and providing two substantially concentrically arranged areas, centrally of said container, to receive substantially separate outer and inner masses of the material to be treated, said outer area being of somewhat greater capacity than said inner area, and the mass of material in said outer area serving to heat insulate the mass of material in said inner area, means for conducting current to said hollow cylindrical element, and a cover substantially sealing the top of said container.

5. An apparatus of the character described, having in combination a closed heat insulated container of substantially cylindrical form having heat insulated side and bottom walls, a hollow cylindrical electrical non-inductively wound heating element engaged within said container in spaced relation to the side and bottom walls thereof, the diameter of said hollow cylindrical heating element being so related to the diameter of the container within which the same is disposed as to provide a larger cubic capacity of the container intermediate said cylindrical element and the walls of said container than within said cylindrical element, but with a less distance between said element and the walls of said container than from the center of such container to the walls of said cylindrical heating element, and means for conducting current to said hollow cylindrical element.

HAROLD J. BABCOCK.